April 13, 1971  L. E. STARK  3,574,678
TITANIUM WELDING ELECTRODE
Filed March 7, 1969

INVENTOR.
LOUIS E. STARK
BY Walter P. Wood
ATTORNEY.

United States Patent Office 3,574,678
Patented Apr. 13, 1971

3,574,678
TITANIUM WELDING ELECTRODE
Louis E. Stark, Youngstown, Ohio, assignor to
Reactive Metals, Inc.
Filed Mar. 7, 1969, Ser. No. 805,253
Int. Cl. B23k *35/00*
U.S. Cl. 117—204                     6 Claims

ABSTRACT OF THE DISCLOSURE

Titanium electrode which has a metal coating, preferably formed by dipping the electrode in a molten aluminum bath. This coating prevents the electrode from oxidizing during a welding operation. The electrode also has an arc-stabilizing coating of a halide salt. By use of this electrode, titanium bodies can be welded manually and the weld remains visible to the welder.

---

This invention relates to an improved titanium welding electrode and method of welding titanium bodies.

As used in the present specification and claims, the term "titanium" refers to the various titanium-base alloys, as well as the commercially pure metal. Hot or molten titanium is highly reactive with other elements. Hence special techniques are required to weld titanium bodies. Heretofore good arc welds have been obtained only by the gas-metal-arc (MIG) process or the gas-tungsten arc (TIG) process, both of which require complex equipment as well as having other disadvantages. In the MIG process a continuous titanium wire electrode is fed from a spool into the weld zone. Visibility is obscured by devices mounted in the electrode holder for admitting a protective inert gas and cooling water. In the TIG process titanium filler material must be supplied separately from the heat source. The process is relatively slow, and it is difficult to add filler material in confined spaces, such as corners, small cylinders or narrow slots. Neither process permits the ease, flexibility and low-cost operation of manual welding made possible by my invention.

An object of my invention is to provide an improved titanium welding electrode and method of welding which simplify welding titanium bodies and permit manual operation with the weld remaining visible to the welder.

A more specific object is to provide an electrode and method which afford these advantages and in which the electrode has coatings of an oxidation resistant metal and an arc-stabilizing salt.

Figure 1:
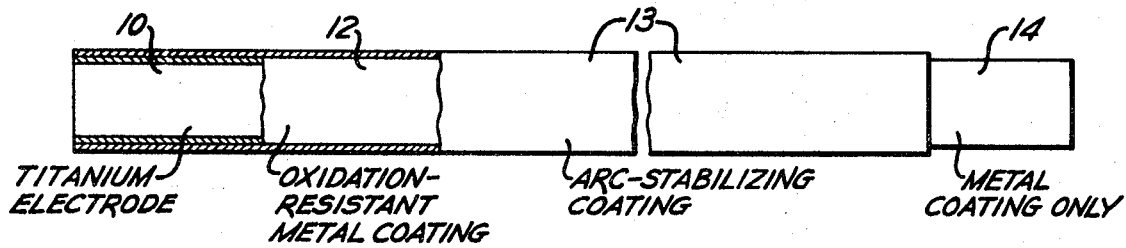
FIG. 1 is a diagrammatic side elevational view, not to scale, of an electrode formed in accordance with my invention with the coatings partially broken away to show the structure.

As FIG. 1 shows, my welding electrode consists of a titanium rod 10 which has a first coating 12 of an oxidation-resistant metal and a second coating 13 of an arc-stabilizing salt. The salt coating terminates about an inch from one end of the rod to leave an exposed metal area 14 which enables good electrical contact to be made with the electrode. The rod may be of any convenient length, for example about 6 to 18 inches, or preferably 12 inches. The rod may be about 1/16 to 3/8 inch in diameter, or preferably about 1/8 to 3/16 inch. I choose the exact composition of the rod to be compatible with the composition of the bodies I wish to weld.

The metal coating 12 is uniform and non-porous, and it may be of aluminum, copper, iron or other metals or alloys which do not dissolve oxygen. I prefer aluminum, since it is included in most titanium-base alloys. Also, aluminum is easily applied by dipping the rod into a molten aluminum bath, which has a flux covering to prevent formation of an oxide skin on its surface, such as might hinder uniform wetting of the titanium. The metal coating has a thickness of about 0.1 to 5 mils. I control its thickness by the choice of immersion time, bath temperature and extraction speed. Conveniently I may coat a continuous length of wire or rod and later cut it to suitable length. Alternatively I may apply the coating by an electroplating process.

The arc-stabilizing coating 13 is a halide salt of an alkali metal, an alkaline earth metal or a rare earth metal. I prefer barium fluoride, since it is particularly effective in improving the arc and melting characteristics. Other examples of salts I can use are calcium fluoride, strontium fluoride, potassium chloride, cerium fluoride, or fluorides or chlorides of mischmetal. I may apply this coating by dipping or spraying the metal-coated rod with slurry or paste formed with a liquid, such as water, acetone or alcohol, or extruding or brushing the material over the rod. I prefer non-aqueous liquids which dry more readily after the coating is applied. The coating 13 may be very light and only sufficient to cover the metal, or it may be of substantial thickness so that its weight is as the rod itself. I prefer a light coating to minimize spalling or dusting of the coating.

Figure 2:
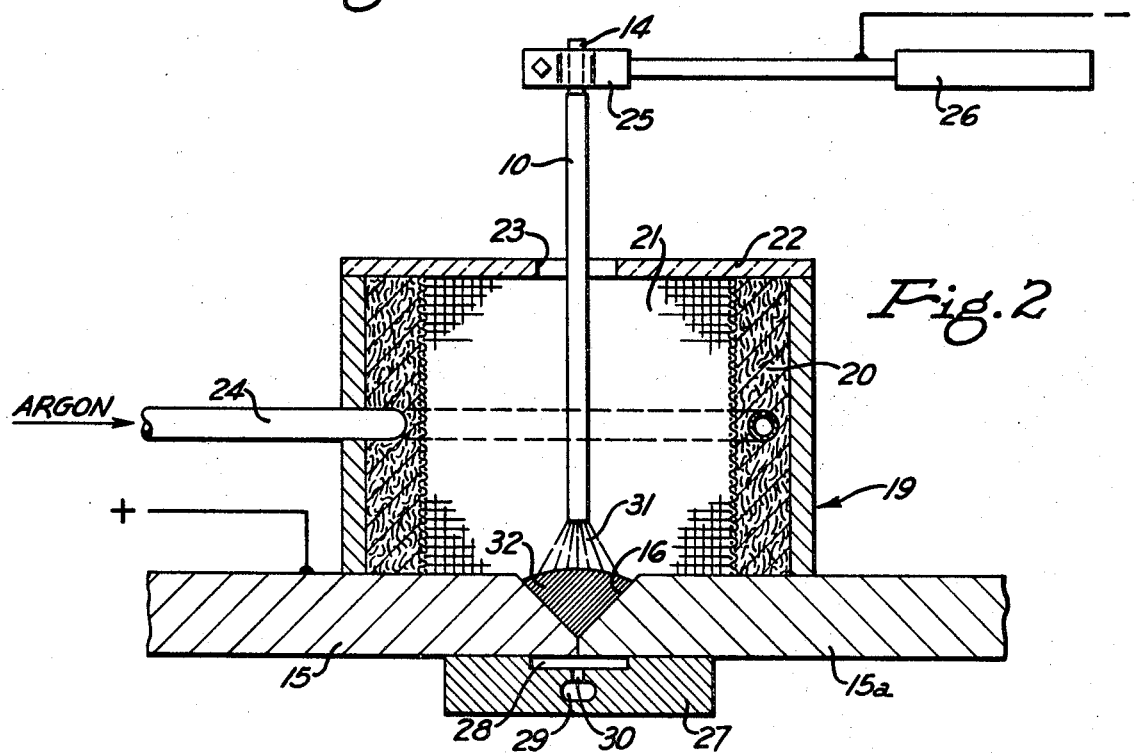
FIG. 2 is a diagrammatic vertical sectional view, not to scale, of the equipment used during a welding operation in accordance with my invention.

FIG. 2 illustrates the way I arrange the equipment to weld two titanium plates 15 and 15a which abut at their edges. The upper edges of the plates are beveled as indicated at 16. I place a portable metal cannister 19 over the edges to be welded. Preferably the cannister has a lining 20 of bronze wool or the like and an internal screen 21 which holds the lining in place. The cannister has a removable transparent cover 22, preferably of "Pyrex" glass, which has a central opening 23. A distributor tube 24 for introducing protective inert gas, usually argon, extends through the cannister into the lining 20. The tube extends substantially around the circumference of the cannister within the lining and has a series of drilled holes to distribute the gas. I mount the electrode 10 in a conventional clamp 25 which engages the exposed metal end portion 14 of the electrode. The clamp has an insulated handle 26. I connect the clamp and the plates 15, 15a to the negative and positive sides respectively of a suitable source of welding current. I place the abutting edges of plates 15 and 15a over a conventional backing bar 27. The bar has a longitudinal channel 28 in its upper face and a longitudinal passage 29 which communicates with the channel through a series of drilled holes 30.

I insert the electrode 10 into the cannister 19 through the opening 23. I introduce inert gas to the interior of the cannister 19 through tube 24 and to the underside of the abutting plates through passage 29 and channel 28 of the backing bar 27. I strike an arc 31 between the end of the electrode and the plates along the line to be welded. The electrode melts and forms a weld 32. I hold the handle 26 manually with one hand and move the cannister 19 with the other hand as the operation proceeds. The weld is readily visible through the transparent cover 22. Flow of current through the upper portion of the electrode of course heats the electrode, but the metal coating 12 effectively prevents oxidation of the heated titanium. The arc-stabilizing coating 13 assures a transfer of fine droplets of titanium from the electrode to the weld.

Figure 3:
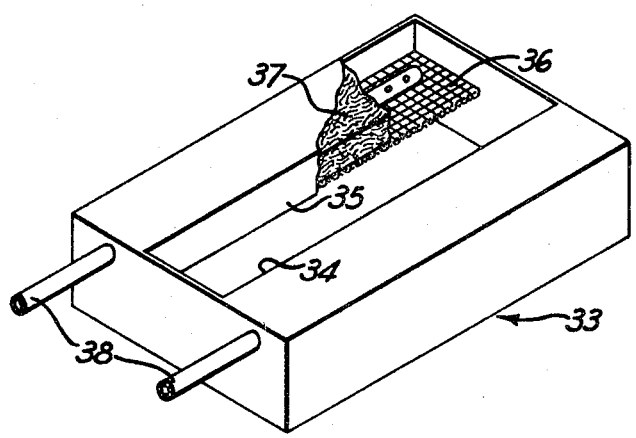
FIG. 3 is a perspective view with parts broken away of a modified construction of cannister which I may use in the welding operation.

FIG. 3 shows a modified cannister 33 formed as a rectangular open-bottom box, the top wall of which has an elongated opening 34 extending its full length. The top wall segments have depending flanges 35 along each side of the opening 34. Screens 36 underlie the top wall segments and support lining 37 of bronze wool or the like in the space between the screen and top. Distributor tubes 38 for inert gas extend through the end walls of the cannister and through the linings 37. The tubes have a series of drilled holes for distributing the gas. The weld of course is visible through the opening 34.

As a specific example of a welding operation conducted in accordance with my invention, I beveled two plates 15 and 15a to a 30° angle along one edge and butted the plates to give a 60° included angle. The plates were of an alloy which consisted of 7% aluminum, 2% columbium, 1% tantalum, and the balance substantially titanum. I prepared electrodes from 3/16 inch diameter wire cut to 13 inch lengths of an alloy which consisted of 6% aluminum, 2% columbium, 1% tantalum, 1% molybdenum and the balance substantially titanium. I dipped the electrodes into a molten aluminum bath which had a flux covering, washed the electrodes to remove the flux, and cut them to 11 inch lengths to crop the non-uniform ends. I brushed a slurry of barium fluoride in alcohol over the rod, except for one inch at one end. I clamped an electrode thus prepared in a holder which engaged the end portion without the salt coating.

I clamped the two plates to a copper backing bar 27 and positioned a cannister 33 over the beveled groove. The cannister was constructed as shown in FIG. 3, 3¼ inches wide, by 6 inches long, by 2 inches high. I admitted argon at a rate of 10 cu. ft./hr. to the backing bar and 50 cu. ft./hr. at each side of the cannister. I started an arc between the electrode and plates at one end of the groove and welded about 2½ inches until the electrode length was down to about 2 inches. I replaced the electrode and continued the process and filled the groove with three passes. I turned the plates over and made a root-sealing pass using a similar procedure. The average hardness and oxygen content of the weld were as follows:

Average hardness—35.3 Rockwell C
Oxygen at top—0.060%
Oxygen at top center—0.055%
Oxygen at bottom center—0.069%
Oxygen at bottom—0.072%
Oxygen average—0.064%

The oxygen analyses throughout the weld showed that manual welds can be made without oxidation of the weld metal deposited within the cannister and no oxidation of the hot aluminum coated electrode exposed to air above the cannister.

The beneficial effect of the barium fluoride could be observed throughout the welding operation. Bare electrodes ore electrodes with aluminum coating only give unstable arc conditions; the arc voltage may vary between 13 and 25 volts with frequent short circuits, open circuits, large drops of metal transfer, and sticking of the electrode. With barium fluoride coating, arc voltage was lowered to 10 to 13 volts and was steady, and metal transfer was by a spray of fine drops.

I claim:

1. A welding electrode comprising a titanium rod, a uniform non-porous coating on said rod of a metal which does not absorb oxygen, and an arc-stabilizing coating over said metal coating of a halide salt of a metal selected from the group which consists of alkali metals, alkaline earth metals and rare earth metals.

2. An electrode as defined in claim 1 in which said metal coating is aluminum.

3. An electrode as defined in claim 2 in which said metal coating is applied by dipping the rod in flux-covered molten aluminum bath.

4. An electrode as defined in claim 1 in which said arc-stabilizing coating is barium fluoride.

5. An electrode as defined in claim 1 in which said arc-stabilizing coating terminates a distance from the end of the rod to leave an area of exposed metal which enables good electrical contact to be made with the electrode.

6. An electrode as defined in claim 1 in which said metal coating is aluminum and said arc-stabilizing coating is barium fluoride.

References Cited

UNITED STATES PATENTS 2,825,793   3/1958   Kee.

WILLIAM L. JARVIS, Primary Examiner

U.S. Cl. X.R.

117—205, 207